(No Model.)　　　　　　　　　　　　　　　　2 Sheets—Sheet 1.
C. ROBERTS.
CORN SHELLER.
No. 353,885.　　　　　　　　　Patented Dec. 7, 1886.
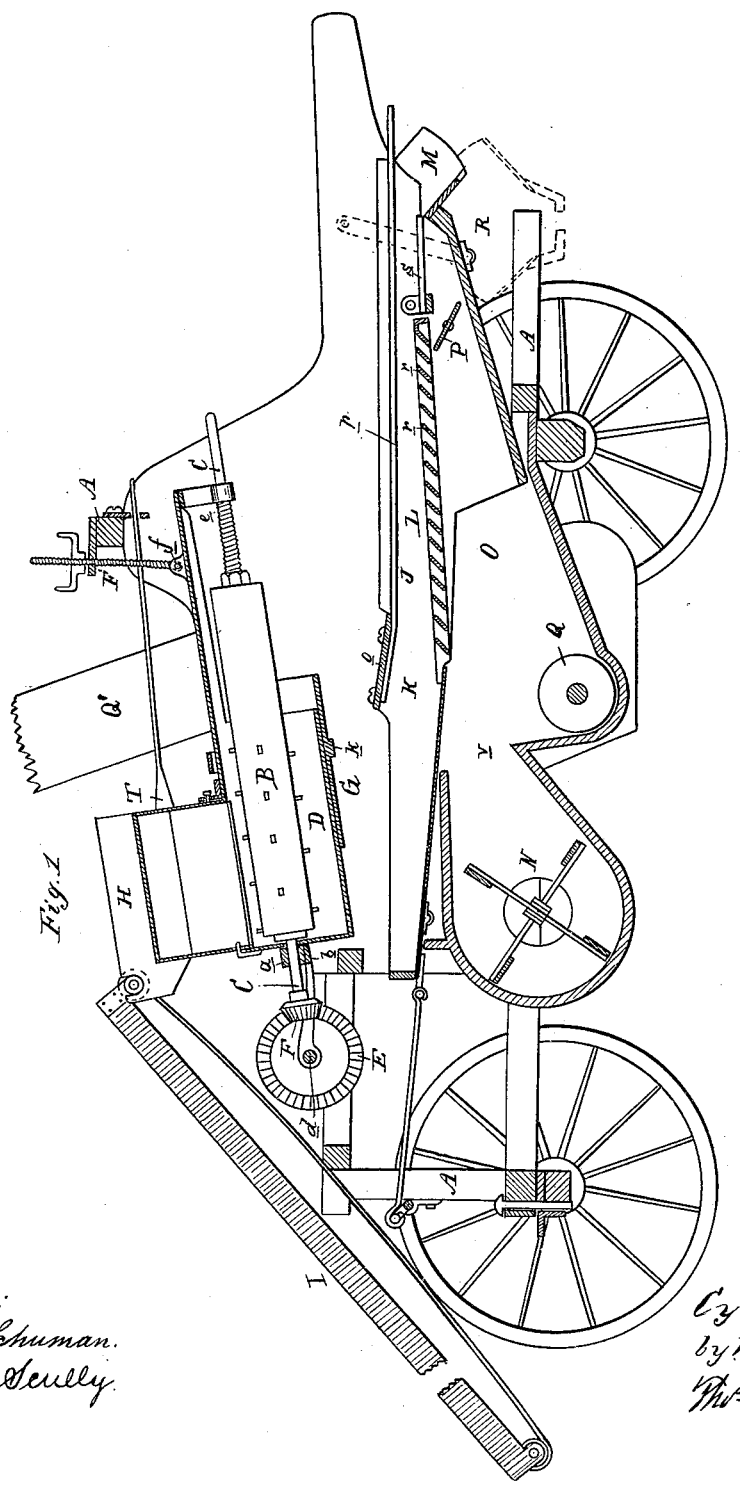
Attest:
John Schuman.
E. T. Scully.
Inventor:
Cyrus Roberts.
by his Atty
Thos. S. Sprague

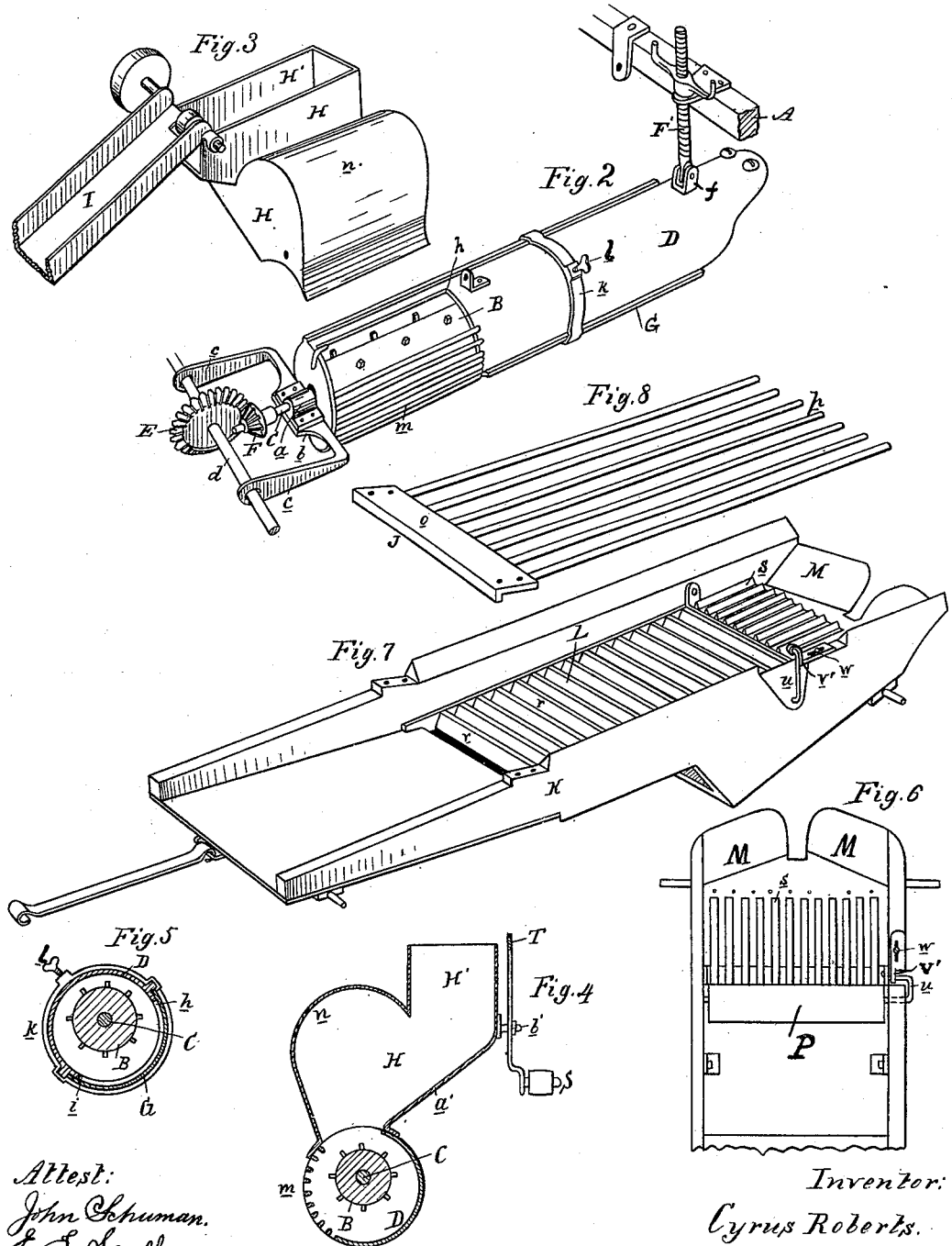

UNITED STATES PATENT OFFICE.

CYRUS ROBERTS, OF THREE RIVERS, MICHIGAN.

CORN-SHELLER.

SPECIFICATION forming part of Letters Patent No. 353,885, dated December 7, 1886.

Application filed January 29, 1886. Serial No. 190,211. (No model.)

*To all whom it may concern:*

Be it known that I, CYRUS ROBERTS, of Three Rivers, in the county of St. Joseph and State of Michigan, have invented new and useful Improvements in Corn Shellers; and I do hereby declare that the following is a full, clear, and exact description thereof, reference being had to the accompanying drawings, which form a part of this specification.

This invention relates to certain new and useful improvements in the construction of a corn-sheller, which will, first, strip the husks or shucks from the ears of corn presented to it; second, strip the corn itself from the cobs; third, separate the corn from the husks and cobs and clean it; and, fourth, separate the husks from the cobs and deposit the same outside the machine in distinct or separate piles.

Heretofore there have been several kinds of mechanism employed to do this work. Some of them were designed to remove the husks from the ears preparatory to presenting the latter to other machines that were designed to remove the grain from such cobs, or "shell" the corn and clean the same. Other machines have been designed to "husk" and shell and separate the shelled corn from the husks and cobs.

I had designed that the machine invented by me, and described in Letters Patent No. 278,824, and issued to me on the 5th day of June, 1883, should accomplish the results which the present invention will do; but when such machine was put to practical use it would but partially perform as desired. Therefore the present invention is designed to be an improvement not only upon the machine above mentioned, but upon this class of machines in general.

The invention consists in the peculiar construction of its parts, their arrangement with relation to each other, and their combinations, as more fully hereinafter described and claimed.

Figure 1 is a vertical central longitudinal section through my improved machine. Fig. 2 is a perspective view of the cylinder and case detached. Fig. 3 is a detached perspective view of the hopper. Fig. 4 is a vertical longitudinal section of the same. Fig. 5 is a cross-section of the cylinder and its case. Fig. 6 is a plan of the rear end of the shoe and its attachments. Fig. 7 is a detached perspective view of the shoe with the cob-riddle removed. Fig. 8 is a detached perspective view of the cob-riddle.

In the drawings, A is a suitable frame-work supported upon suitable wheels and axles for greater ease in transporting the machine from place to place, and such frame in turn supports the operating parts of the machine and its case. B is a toothed husking and shelling cylinder upon a shaft, C, which runs through the cylindrical inclosing-case D, eccentric to the axis of such case.

One end of the shaft C is supported in a box, *a*, which is centrally secured to the bail *b* of a yoke, the arms *c* of which are mounted on the shaft *d*, so that the yoke may rock on the said shaft. This shaft *d* is the main driving-shaft, and has secured upon it a bevel-toothed wheel, E, which engages with the bevel-pinion F on the overhanging end of the shaft C, and thereby gives motion to the shelling-cylinder. The rear end of this shaft C is supported in a hanger, *e*, pendent from the top of the rear end of the case D, and this end of the case is supported from the top of the frame A by means of ears *f* and an adjusting screw, F', these parts being so arranged that the rear end of the cylinder and its case may be raised or lowered, as may be desired or varying circumstances may require, without changing the relative position of the cylinder and its case to each other. This case D is cylindrical in form where it incloses the toothed section of the shelling-cylinder; but from the rear end of this section the case is cut away from *h* to *i* in Fig. 5, and a curved slide, G, is fitted to the periphery of the case and adapted to slide longitudinally or back onto the solid part of the case, and when extended to close, or partially close, as may be desired, the open part of the case. This sliding part of the case, which is marked G, is clamped in its desired position by means of the band *k* and set screw *l*, such band passing around the imperforate part of the case; but no claim is made herein to the peculiar construction of the case and its slide, as the same is claimed in combination with other parts in another application filed by me of even date herewith and numbered 190,212.

As already described, the shelling-cylinder is eccentric to the axis of its case, being nearer the top than the bottom of the same, and the bars *m*, instead of being at the bottom, as is usual in cylinders for a similar purpose, are upon the side, as shown in Figs. 2 and 4. The object of this arrangement is, first, to prevent any tendency to choke below the cylinder, and, second, to bring the latter into operation as soon as the ears are fed to it through the hopper H. The construction or shape of this hopper is fully shown in Figs. 3 and 4, wherein the mouth of the hopper is vertical, and has an inclined floor to guide the material to the cylinder and to prevent the rotation of the cylinder from accidentally throwing out any of the ears fed to it. The mouth of the hopper is not vertically above the opening to the cylinder, but is set to one side, and immediately above the opening into the cylinder there is formed a curved shield, *n*, against which anything thrown out by the cylinder would impinge, and would thence be thrown back onto the inclined floor of the hopper. An elevator, I, of any suitable construction, and driven from any suitable source of power, is employed to carry the ears up into this hopper. The rear end of the cylinder-case is open, so that the material acted upon by the cylinder is discharged through this open end onto the cob-separator J, which is formed of a head, *o*, having long fingers *p* projecting to and through the rear end of the machine, and is attached by means of its head *o* to the shoe K, immediately above the riddle L. This riddle is formed of a series of parallel slats, *r*, set sloping toward the front of the machine, as shown in section in Fig. 1, and at the rear end of these cross-slats of the riddle there are arranged a series of inclined longitudinal slats, *s*, the rear ends of which terminate at the discharge-spout M.

N is a suitable fan arranged in a case immediately below the front and imperforate part of the shoe K, and this case has a mouth, *v*, through which the currents of air created by the motion of the fan are discharged or directed into the wind-chamber O in such a manner that if the adjustable wind-guide P closes the rear end of such chamber all the air will be forced up through the interstices or spaces between the slats *r* of the riddle, through which the grain or shelled corn is dropped into the wind-chamber. This current of air is strong enough as it passes out through the riddle and through the cob-separator to so agitate the husks (being aided by the motion of the shoe and its attachments) as to allow the cobs, which are the heavier, to fall between the fingers of the cob-separator J onto the riddle L, and thence be forced rearward by the vibratory motion of such riddle onto the horizontal bars *s*, which form an extension to the rear of said riddle, the spaces between the bars *r* of the riddle being too small to allow the cobs to pass through them.

Any of the ordinary appliances may be attached to the shoe K, by means of which a vibratory or shaking motion may be given to it, and the grain as it falls through the riddle L drops onto the inclined floor of the wind-chamber O, which carries it to the conveyer Q, connecting with the elevator Q', which takes the grain from the machine. The wind-guide P extends across the wind-chamber, near the rear end of the riddle L, upon a shaft which projects through the sides of the case of such wind-chamber. The projecting end of this shaft is turned upwardly, as shown at *u* in Figs. 6 and 7, the upper end thereof being bent to engage with the loop *v'* upon the end of the slide *w*, which, by means of a slot and screw, is secured to the top of the shoe, as shown in said figures. By these means the wind-guide can be set at any desired point, either to compel all the air to pass through the riddle, or, by partially opening such wind-guide, to allow a portion of the air to pass up through the longitudinal slats *s*, to carry with it any small particles that may be mingled with the corn as it passes into the wind-chamber to the hopper M. As the cobs pass over the slats *s* they fall into a spout, M, at the rear end of such slats, whence they are conducted to the hopper R, arranged below such slats, and can be delivered to an elevator or conveyer, which will deliver them where required.

What I claim as my invention is—

1. In a corn-sheller, the combination, with the cylinder and inclosing-case, of a vibrating shoe located below the same, the cob-separator, the corn-separating riddle located immediately below said cob-separator, a wind-chamber extending underneath the whole length of said riddle and separator, and a fan within said chamber, said riddle and cob-separator being attached to the shoe, and all substantially as described.

2. In a corn-sheller, the combination, with the shelling-cylinder and inclosing-case, of the vibrating shoe, the cob-separator, the corn-separating riddle attached to said shoe, the horizontal longitudinal bars located at the rear end of said riddle, and a spout beneath said bars, substantially as described.

3. In a corn-sheller, the combination, with the shelling-cylinder and inclosing-case, of a vibrating shoe, the cob-separator having a head attached to said shoe, the riddle L, located beneath said separator, the inclined slats *s* at the rear end of the riddle, the wind-chamber O, having the inclined floor, a fan for creating a wind-current, the conveyer Q, and wind-guide P in said chamber, all constructed, arranged, and operating substantially as and for the purposes specified.

4. A corn-sheller having the following elements: a shelling-cylinder and an inclosing-case, a feeding-hopper, a vibrating shoe provided with a cob-separator, a riddle, and cob-delivering slats, a cob spout and hopper, a fan located under the front end of the shoe, a wind-chamber extending underneath the whole length of the riddle and cob-delivering slats, and an adjustable wind-guide adapted to direct all the air-currents through the riddle or to divide them and allow a portion of such currents to pass through the cob-delivering slats, the parts being constructed, arranged relatively to each other, and operating substantially as and for the purposes described.

CYRUS ROBERTS.

Witnesses:
E. J. SCULLY,
H. S. SPRAGUE.